US008509843B2

(12) United States Patent
Takahashi et al.

(10) Patent No.: US 8,509,843 B2
(45) Date of Patent: Aug. 13, 2013

(54) MOBILE COMMUNICATION TERMINAL, DATA TRANSMISSION METHOD, APPARATUS, AND DATA RECEPTION METHOD

(75) Inventors: Masaru Takahashi, Yokosuka (JP); Hiroshi Nakamura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 729 days.

(21) Appl. No.: 12/270,360

(22) Filed: Nov. 13, 2008

(65) Prior Publication Data

US 2009/0131102 A1 May 21, 2009

(30) Foreign Application Priority Data

Nov. 15, 2007 (JP) ................ P2007-297097

(51) Int. Cl.
*H04B 1/00* (2006.01)
(52) U.S. Cl.
USPC ............ 455/552.1; 455/63.1; 455/67.11; 455/68; 455/132; 455/133; 455/435.2; 455/450; 370/350; 370/352; 370/469; 370/329; 370/331; 370/395.2; 370/466
(58) Field of Classification Search
USPC ............ 455/63.1, 67.11, 68, 132, 133, 435.2, 455/450; 370/350, 352, 469, 329, 331, 395.2, 370/466
See application file for complete search history.

(56) References Cited

U.S. PATENT DOCUMENTS

| | | | |
|---|---|---|---|
| 6,269,252 B1* | 7/2001 | Hutchings et al. | 455/552.1 |
| 6,285,882 B1* | 9/2001 | Cornillat et al. | 455/435.1 |
| 7,054,893 B2* | 5/2006 | Mogi et al. | 1/1 |
| 7,346,042 B2* | 3/2008 | Horiguchi et al. | 370/352 |
| 7,539,175 B2* | 5/2009 | White et al. | 370/350 |
| 2004/0088371 A1* | 5/2004 | Hiramatsu et al. | 709/217 |
| 2004/0236772 A1* | 11/2004 | Arakawa et al. | 707/100 |
| 2004/0252696 A1* | 12/2004 | Kakishima et al. | 370/395.2 |
| 2006/0193295 A1* | 8/2006 | White et al. | 370/336 |
| 2008/0220787 A1* | 9/2008 | Stanwood et al. | 455/450 |
| 2008/0220788 A1* | 9/2008 | Stanwood et al. | 455/450 |

FOREIGN PATENT DOCUMENTS

| | | |
|---|---|---|
| CN | 1659803 A | 8/2005 |
| CN | 1765087 A | 4/2006 |
| DE | 102 58 425 A1 | 7/2004 |

(Continued)

OTHER PUBLICATIONS

Office Action issued Oct. 26, 2011, in China Patent Application No. 200810176321.1 (with English Translation).
Office Action issued on May 28, 2012 in the corresponding Chinese Application No. 200810176321.1 (with English Translation).
Japanese Office Action issued May 22, 2012, in Japan Patent Application No. 2007-297097 (with English translation).

(Continued)

*Primary Examiner* — April G Gonzales
(74) *Attorney, Agent, or Firm* — Oblon, Spivak, McClelland, Maier & Neustadt, L.L.P.

(57) ABSTRACT

In order to transmit data via a plurality of types of communication networks in accordance with the communication environment at the time of data transmission, a mobile telephone, which is capable of being connected to a plurality of types of mobile communication networks, is provided with a detector for detecting the communication status of a mobile communication network based on a control signal transmitted from this mobile communication network; a storage unit for storing the detected communication status; an allocation unit for allocating data to each connected mobile communication network based on the amount of the data addressed to another communication apparatus and the stored communication status; and a transmitter for transmitting the data that has been allocated to each mobile communication network to the respective mobile communication networks.

8 Claims, 13 Drawing Sheets

(56) References Cited

FOREIGN PATENT DOCUMENTS

| EP | 1 638 256 A1 | 3/2006 |
|---|---|---|
| JP | 2000-134260 | 5/2000 |
| JP | 2004-112512 | 4/2004 |
| JP | 2005-12724 | 1/2005 |
| JP | 2006-115414 | 4/2006 |

OTHER PUBLICATIONS

Japanese Office Action mailed Jul. 31, 2012 in Japanese Patent Application No. P2007-297097 filed Nov. 15, 2007 (with English translation).

* cited by examiner

*Fig.4*

|  |  | COMMUNICATION STATUS | | |
|---|---|---|---|---|
|  |  | SUBSCRIPTION | SIGNAL | CONGESTION |
| WIRELESS COMMUNICATION SCHEME | PDC | × | — | — |
|  | CDMA | ○ | ○ | × |
|  | HSDPA | ○ | ○ | × |
|  | WLAN | ○ | × | × |

*Fig.5*

| COMMUNICATION SCHEME | COMMUNICATION SPEED |
|---|---|
| PDC | 9.6kbps |
| CDMA | 384kbps |
| HSDPA | 14.4Mbps |
| WLAN | 11Mbps |

MOBILE COMMUNICATION TERMINAL, DATA TRANSMISSION METHOD, APPARATUS, AND DATA RECEPTION METHOD

BACKGROUND OF THE INVENTION

1. Field of the Invention

The present invention relates to a mobile communication terminal, data transmission method, communication apparatus, and data reception method related to data communications that make use of a plurality of types of communication networks.

2. Related Background Art

Methods for transmitting data to a single communication terminal via a plurality of types of communication networks have been known for some time now. For example, Japanese Patent Laid-open No. 2004-112512 discloses a wireless communication apparatus that transmits data to a single wireless communication apparatus via a plurality of wireless communication schemes. This wireless communication apparatus stores in advance a plurality of division patterns indicating the extent of data division that takes place in various wireless communication schemes. Then, this wireless communication apparatus divides the data in accordance with the specified division patterns at time of use, and sends the divided data via the specified respective wireless communication schemes.

SUMMARY OF THE INVENTION

However, the wireless communication apparatus disclosed in Japanese Patent Laid-open No. 2004-112512 does not take into account the communication environment when deciding on the wireless communication scheme to be used. For this reason, when using this wireless communication apparatus as a mobile communication terminal, this mobile communication terminal is unable to deal with changes in the communication environment, such as a handover (a handover associated with migrating from one cell to another inside the same communication network, or a handover associated with migrating to a different type communication network), a disconnection, a communication line power outage, and congestion, and thus runs the risk of a transmission delay and transmission interruption at data transmission time.

The present invention has been devised to solve for the above problems, and an object of the present invention is to provide a mobile communication terminal, a data transmission method, communication apparatus and data reception method that make it possible to transmit data via a plurality of types of communication networks in accordance with the communication environment at the time of data transmission.

A mobile communication terminal of the present invention is a mobile communication terminal capable of being connected to a plurality of types of communication networks, and comprises detection means for detecting a communication status of a communication network based on a control signal transmitted from the communication network; storage means for storing the communication status detected via detection means; allocation means for allocating data to the respective communication networks to which the mobile communication terminal is connected based on the amount of data addressed to another communication apparatus and the communication status stored by storage means; and transmission means for transmitting the data allocated to each communication network via allocation means to the respective communication networks.

Further, a data transmission method of the present invention is a data transmission method for a mobile communication terminal capable of being connected to a plurality of types of communication networks, and comprises a detecting step detecting the communication status of a communication network based on a control signal transmitted from the communication network; a storing step storing a communication status detected via the detecting step; an allocating step allocating data to the respective communication networks to which the mobile communication terminal is connected based on the amount of data addressed to another communication apparatus and the communication status stored in the storing step; and a transmitting step transmitting the data allocated to each communication network via the allocating step to the respective communication networks.

In accordance with a mobile communication terminal and a data transmission method such as these, the communication status of a communication network is detected and stored based on the control signal transmitted from this communication network. The control signal here is a signal showing information for deriving a communication status (for example, the availability of communications and the communication area). Next, based on the amount of data addressed to the other communication apparatus (data size) and the stored communication status, this data is respectively allocated to the connected communication networks, and transmitted to the respective communication networks. Consequently, since the data is allocated to the respective communication networks in accordance with the communication status of the mobile communication terminal, it becomes possible to carry out data transmission via a plurality of types of communication networks in accordance with the communication environment at the time of data transmission.

In this mobile communication terminal of the present invention, it is preferable that allocation means re-allocate data addressed to the other communication apparatus when the communication status of a communication network is updated by storage means.

In this case, when the communication status of a communication network is updated, the re-allocation of data is dynamically carried out based on the latest communication status. As a result, it becomes possible to allocate the data to be transmitted in optimum form each time.

In the mobile communication terminal of the present invention, it is preferable that allocation means allocate data addressed to the other communication apparatus to the respective communication networks based on the communication speed of the respective communication networks.

In this case, the allocation of data to the respective communication networks is carried out based on the communication speed of the respective communication networks to which the mobile communication terminal is connected. Because the communication speed of a communication network affects data transmission efficiency, taking this communication speed into account when allocating data makes it possible to transmit data to the mobile communication terminal more efficiently.

The communication apparatus of the present invention is a communication apparatus capable of being connected to a plurality of types of communication networks and carrying out data communications with the above-mentioned mobile communication terminal, and comprises reception means for receiving data, which has been allocated and transmitted to each of these communication networks by the mobile communication terminal, from the respective communication networks; and reconfiguration means for carrying out reconfiguration so as to restore pre-allocation data from the data received from reception means.

Further, the data reception method of the present invention is a data reception method of a communication apparatus that is connected to a plurality of types of communication networks and receives data from the above-mentioned mobile communication terminal, and comprises a receiving step receiving data, which has been allocated and transmitted to each of these communication networks by the mobile communication terminal, from the respective communication networks; and a reconfiguring step reconfiguring so as to restore pre-allocation data from the data received in the receiving step.

In accordance with a communication apparatus and data reception method like this, data allocated to each communication network by the mobile communication terminal is received by the communication apparatus, and the pre-allocation data is reconfigured from the respective received data. Consequently, it becomes possible to use data that has been restored to its original form.

According to a mobile communication terminal, data transmission method, communication apparatus and data reception method like this, transmission data is allocated to each communication network based on the communication status acquired from the control signals of the communication networks, thereby enabling data to be transmitted via a plurality of types of communication networks in accordance with the communication environment at the time of data transmission.

BRIEF DESCRIPTION OF THE DRAWINGS

FIG. 4 is a table showing examples of communication status information, which is stored in the storage unit shown in FIG. 2;

FIG. 5 is a table showing examples of the communication speed of each wireless communication scheme;

DESCRIPTION OF THE PREFERRED EMBODIMENTS

Figure 1:
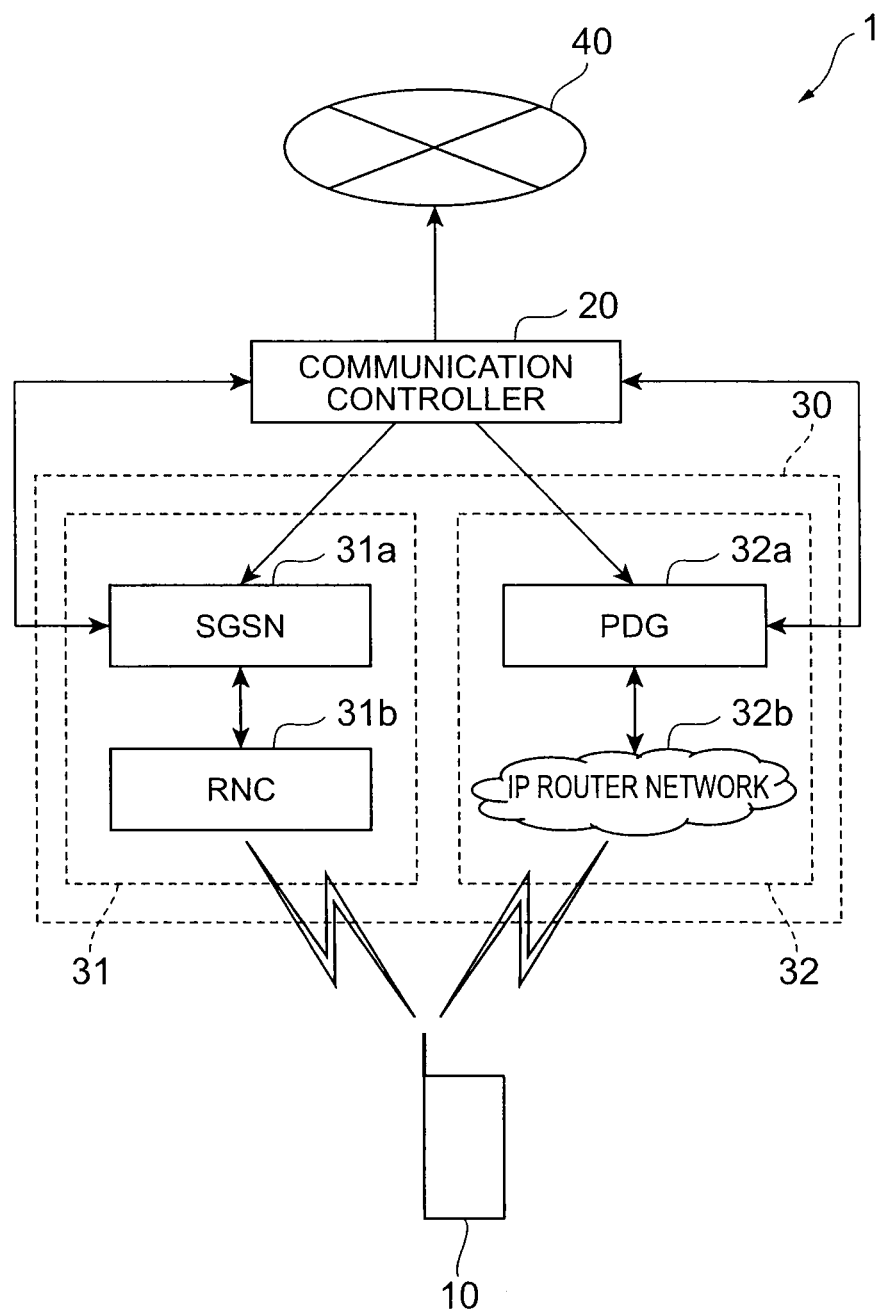
FIG. 1 is a diagram showing a communication system comprising a mobile telephone related to the present invention.

The embodiment of the present invention will be explained in detail hereinbelow while referring to the attached figures. Furthermore, the same reference numerals will be assigned to the same or equivalent elements in the explanations of the figures, and explanations that duplicate one another will be omitted.

First, a communication system 1 comprising a mobile telephone 10 related to the embodiment will be explained using FIG. 1. FIG. 1 is a diagram showing the overall configuration of this communication system 1. This communication system 1 comprises a mobile telephone (mobile communication terminal) 10; a communication controller (communication apparatus) 20; a group of mobile communication networks 30; and a network 40.

The mobile telephone 10 is a mobile telephone that is capable of carrying out data communications using a plurality of communication schemes. For example, the mobile telephone 10 can divide generated data by virtue of an application program installed in the telephone itself, and can respectively transmit the data, which has been divided (hereinafter, referred to as the "divided data") to one or more mobile communication networks. Furthermore, to simplify the explanation, only one mobile telephone 10 is shown in FIG. 1, but a plurality of mobile telephones 10 can exist.

The communication controller 20 is a communication controller that is connected to the group of mobile communication networks 30 and the network 40, and is capable of carrying out data communications via these communication networks. In particular, this communication controller 20 can receive a plurality of divided data from a plurality of mobile communication networks (for example, mobile communication networks 31 and 32), and can carry out reconfiguration so as to restore the original data from these divided data.

The group of mobile communication networks 30 comprise a plurality of types of mobile communication networks. For example, the group of mobile communication networks 30, as shown in FIG. 1, comprises mobile communication networks 31 and 32. The respective mobile communication networks that comprise the group of mobile communication networks 30 utilize mutually different communication schemes. These communication schemes can include, for example, FDMA (Frequency Division Multiple Access), TDMA (Time Division Multiple Access), CDMA (Code Division Multiple Access), HSDPA (High Speed Downlink Packet Access), and WLAN (Wireless LAN). Of course, the communication schemes used by the mobile communication networks are not limited to these. Further, there is also no limit as to the number of mobile communication networks that comprise the group of mobile communication networks 30.

In this embodiment, mobile communication network 31 comprises a Serving GPRS Support Node (SGSN) 31a; and a Radio Network Controller (RNC) 31b. Conversely, mobile communication network 32 comprises a Packet Data Gateway (PDG) 32a; and an IP router network 32b. Furthermore, for the sake of simplicity, only one mobile communication network component each is shown in FIG. 1, but there can be a plurality of these components. Further, the configurations of the respective mobile communication networks comprising the group of mobile communication networks 30 are not limited thereto.

The network 40, for example, is configured from the Internet, Local Area Network (LAN) or a mobile communication network. The specific configuration is not limited.

Figure 2:
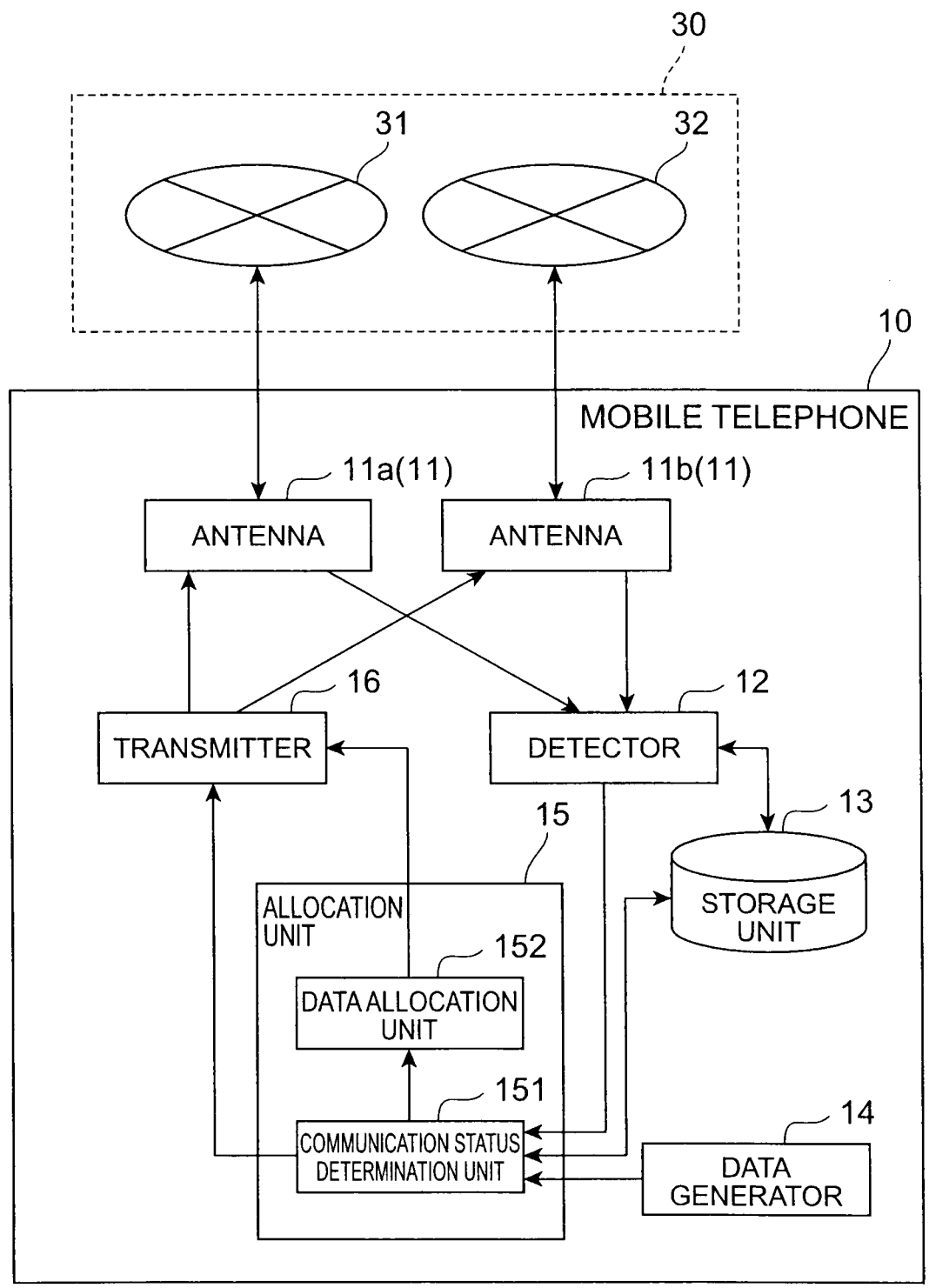
FIG. 2 is a diagram showing a functional configuration of the mobile telephone shown in FIG. 1.
Figure 3:
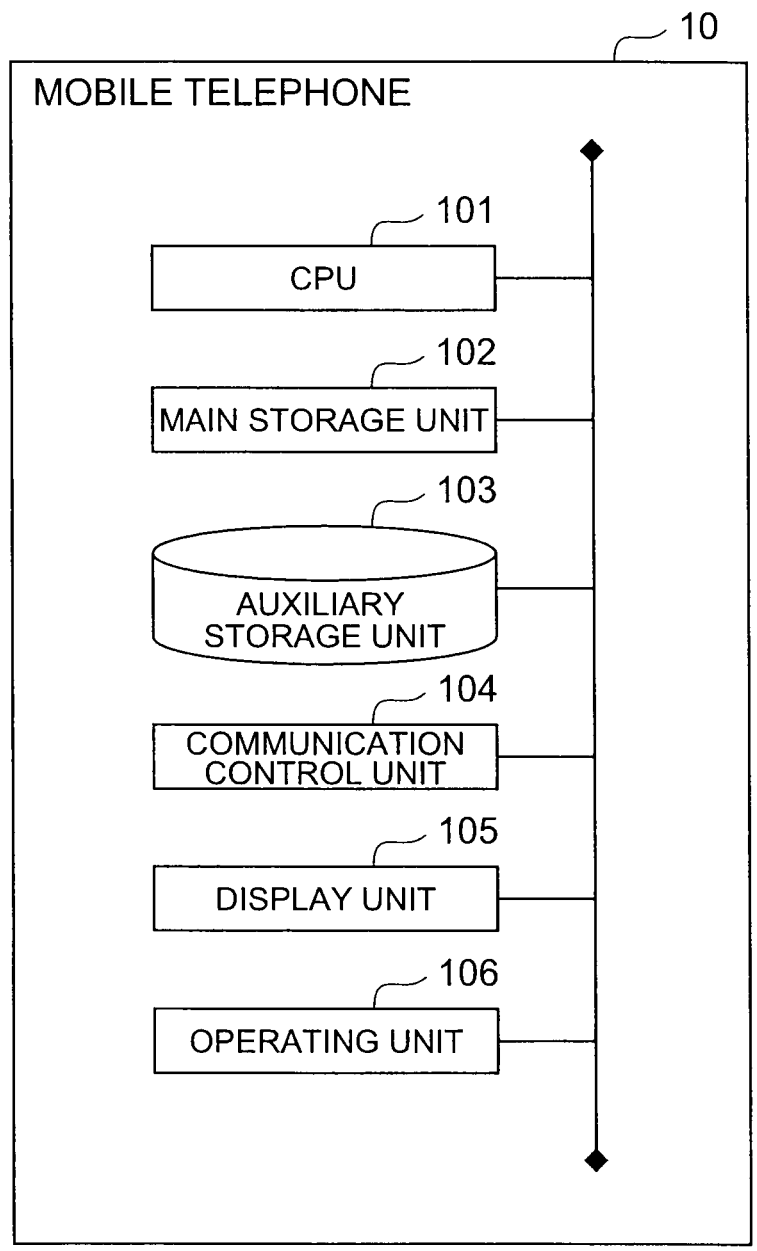
FIG. 3 is a hardware diagram of the mobile telephone shown in FIG. 1.

The mobile telephone 10 related to the present invention will be explained next using FIGS. 2 through 5. FIG. 2 is a diagram showing a functional configuration of the mobile telephone 10 shown in FIG. 1. FIG. 3 is a hardware diagram of this mobile telephone 10. FIG. 4 is a table showing examples of communication status information, which is stored in a storage unit 13. FIG. 5 is a table showing examples of the communication speed of each wireless communication scheme.

The mobile telephone 10 comprises an antenna portion 11; detector (detection means) 12; storage unit (storage means) 13; data generator 14; allocation unit (allocation means) 15; and transmitter (transmission means) 16 as functional components. The allocation unit 15 comprises a communication status determination unit 151; and a data allocation unit 152.

This mobile telephone 10, as shown in FIG. 3, is configured from a CPU 101, which executes an operating system and an application program; a main storage unit 102, which is configured from ROM and RAM; an auxiliary storage unit 103, which is configured from a memory; a communication control unit 104, which carries out data communications via the group of mobile communication networks 30; a display unit 105, which is configured from a liquid crystal monitor; and an operating unit 106, which is configured from keys for carrying out the inputting of characters and numerals and the execution of commands. The respective functions shown and explained using FIG. 2 are realized by reading prescribed software programs into the CPU 101 and main storage unit 102 shown in FIG. 3, operating the communication control unit 104 under the control of the CPU 101, and, in addition, carrying out the writing in and reading out of data to and from the main storage unit 102 and auxiliary storage unit 103.

The antenna portion 11 is the part that transmits and receives signals with the group of mobile communication networks 30, and is configured from a plurality of antennas 11a, 11b. The respective antennas 11a, 11b support mutually different wireless communication schemes. For example, antenna 11a supports CDMA, while antenna 11b supports WLAN. Furthermore, there is no limit on the number of antennas that configures the antenna portion 11, and, for example, the antenna portion 11 can be configured from three antennas for supporting three types of wireless communication schemes. The signals that are transmitted and received by the antenna portion 11 comprise data signals, such as sound data and packet data, and control signals for controlling the wireless communications with the respective mobile communication networks. The respective antennas configuring the antenna portion 11 output a received control signal to the detector 12, and transmit data received from the transmitter 16 to the respective mobile communication networks.

The detector 12 is means for detecting, based on a control signal inputted from the antenna portion 11 (antennas 11a, 11b), the communication status of the mobile communication network that is the source of the control signal. The detector 12 detects the communication status of the mobile communication network that is the source of this control signal by analyzing the control signal, which comprises information for deriving the communication status (for example, the availability of communications and the communication area). As used here, the communication status is either the communication status between the mobile telephone 10 and the group of mobile communication networks 30, or the communication status inside the group of mobile communication networks 30, and is expressed by connection and communication availability, and communication quality.

For example, the detector 12 can detect that the mobile telephone 10 is in the communication area of a prescribed mobile communication network from a control signal that denotes location information, and can detect whether or not a mobile communication network is congested from a control signal that denotes notification information. Further, the detector 12 is also able to detect the accessibility of a prescribed mobile communication network based on a control signal that denotes a response (ACK) to a connection request to this mobile communication network transmitted from the mobile telephone 10. In addition, the detector 12 is able to detect, on the basis of a control signal, information related to the communication status, such as signal strength, communication quality and so forth.

The detector 12 outputs a detected communication status to the storage unit 13 as communication status information. Thereafter, the detector 12 receives an update response outputted from the storage unit 13 in response to the communication status information output. Next, the detector 12 outputs to the allocation unit 15 an update notification denoting that the communication status has been updated.

The storage unit 13 is means for storing the communication status information inputted from the detector 12. Examples of the communication status information stored in the storage unit 13 are shown in FIG. 4. In the examples of FIG. 4, three types of communication statuses, such as subscription status, signal status, and congestion status, are stored for each of a plurality of mobile communication networks (wireless communication schemes) that configure the group of mobile communication networks 30. This example shows that the mobile telephone 10 is subscribed to CDMA, HSDPA and WLAN mobile communication networks, but is not subscribed to a PDC (Personal Digital Cellular) mobile communication network. Further, this example also shows that the mobile telephone 10 is able to use the CDMA and HSDPA, which have good signal status and no congestion, but is unable to use the WLAN for some reason (for example, the signal status is poor or there is no access point).

When the communication status is stored as in FIG. 4, the storage unit 13 binarizes the signal status and congestion status based on the communication status information (in-area information (location information), signal strength, communication quality, congestion information) that has been inputted, and stores this binary value. The storage unit 13 can also use a pre-stored threshold value at this time. For example, the storage unit 13 can determine that the signal status is good when the signal strength is greater than threshold value a, and that the signal status is poor when the signal strength is less than this threshold value a, and can store the signal status on the basis of this determination result.

Furthermore, the method for storing the communication status information using the storage unit 13 is not limited to the method shown in FIG. 4. For example, the storage unit 13 can store the presence or absence of a handover, and can also store the inputted communication status information as-is. Further, instead of storing the signal status as a binary value as in FIG. 4, the storage unit 13, for example, can store this status using three levels, such as strong, medium, or weak, or as even more multi-tiered levels.

The storage unit 13, subsequent to updating (storing) the communication status information, generates an update response denoting that updating has been completed, and outputs this response to the detector 12.

Returning to FIG. 2, the data generator 14 is means for generating data for transmission to the other communication apparatus (not shown in the figure) via the group of mobile communication networks 30. This data comprises address information (for example, an IP address, URL (Uniform Resource Locator), or e-mail address) denoting the transmission destination. The data generation method is not limited. For example, the data generator 14 can generate data based on input received from the operating unit 106, and can generate data stored in the main storage unit 102 or auxiliary storage unit 103, or data for transmission based on the result of an operation by the CPU 101. The data generator 14 outputs generated data to the allocation unit 15.

The allocation unit 15 is means for allocating inputted data to each connected mobile communication network based on the amount of data (data addressed to the other communication apparatus) inputted from the data generator 14 and the communication statuses of the respective mobile communication networks being stored by the storage unit 13. In other words, the allocation unit 15 divides the data on the basis of the communication status information stored in the storage unit 13. This processing is executed in accordance with the collaboration of the communication status determination unit 151 and the data allocation unit 152 that configure the allocation unit 15.

The communication status determination unit 151 is means for determining the communication status of the mobile telephone 10 triggered by the inputting of the update notification from the detector 12, and for deciding whether or not to divide the data inputted from the data generator 14 based on the result of this determination. When the update notification is inputted, the communication status determination unit 151 reads out the communication status information from the storage unit 13, and, using this communication status information, determines if there is one or a plurality of mobile communication networks with which the mobile telephone 10 is able to communicate. Then, the communication status determination unit 151, upon determining that the mobile telephone 10 is only able to communicate with one mobile communication network, appends information, which identifies the mobile communication network with which communication is possible, to the data inputted from the data generator 14 and outputs this data to the transmitter 16. Conversely, upon determining that the mobile telephone 10 is able to communicate with a plurality of mobile communication networks, the communication status determination unit 151 outputs the inputted data and the read-out communication status information to the data allocation unit 152.

For example, when the communication status information being stored in the storage unit 13 are the subscription status, signal status and congestion status as shown in FIG. 4, the communication status determination unit 151 determines that communication is possible with a mobile communication network (wireless communication scheme) for which there is a subscription, the signal status is good and there is no congestion. In the case of the example of FIG. 4, the communication status determination unit 151 determines that communication is possible with the CDMA mobile communication network and the HSDPA mobile communication network, that is, with two mobile communication networks. In this case, the communication status determination unit 151 outputs the inputted data and the communication status information shown in FIG. 4 to the data allocation unit 152.

The data allocation unit 152 is means for carrying out data allocation to respective mobile communication networks based on the data and communication status information inputted from the communication status determination unit 151. The data allocation unit 152, first, acquires the amount (data size (in "byte" units)) of the inputted data, and the communication speed of the communication scheme comprised in the communication status information. Next, the data allocation unit 152 decides the data size to be allocated to the respective mobile communication networks based on the acquired data size and communication speed. Next, the data allocation unit 152 divides the data based on this decision, and appends identification numbers to each piece of divided data.

Next, the data allocation unit 152 outputs divided data to which the identification numbers have been appended to the transmitter 16.

To carry out data allocation, the data allocation unit 152 stores the communication speed (bandwidth) (in "bps" units) of each communication scheme beforehand. FIG. 5 is a table showing examples of the communication speed of each communication scheme that is stored. The data allocation unit 152 acquires a mobile communication network (wireless communication scheme) with which communication is possible from the inputted communication status information, and computes the following equation (1) based on the communication speed supported by the acquired mobile communication network.

[E1]
$$N_n = \frac{a_n}{\sum_i a_i} \quad (1)$$

Here, $N_n$ is the data allocation ratio of communication scheme n, and $a_n$ is the communication speed of the communication scheme n.

For example, when the inputted communication status information shows that it is possible to communicate with the HSDPA at a communication speed of 14.4 Mbps and with the WLAN at a communication speed of 11 Mbps, the data allocation unit 152 computes the above-mentioned equation (1), and decides that the allocation ratio to the HSDPA mobile communication network is 14.4/(14.4+11)×100=56.7(%), and that the allocation ratio to the WLAN mobile communication network is 11/(14.4+11)×100=43.3(%).

Next, the data allocation unit 152 allocates the inputted data to the respective mobile communication networks with which communication is possible in accordance with the computed allocation ratios. That is, the data allocation unit 152 generates divided data in accordance with the allocation ratios. The data allocation unit 152 includes identification numbers, and information for identifying the data allocation-destination mobile communication networks at this time. For example, when the respective communication schemes of mobile communication networks 31 and 32 are HSDPA and WLAN, the data allocation unit 152 generates 5.67 MB (megabytes) of divided data comprising the information "ID No. 1, mobile communication network 31 (HSDPA)", and 4.33 MB of divided data comprising the information "ID No. 2, mobile communication network 32 (WLAN)" relative to 10 MB of data. That is, the data allocation unit 152 allocates data on the basis of communication speed of the respective mobile communication networks.

In addition to the above, the data allocation unit 152 correspondently stores the inputted communication status information and the computed allocation ratios. Then, at the next data transmission, the data allocation unit 152 compares the inputted communication status information against the communication status information stored when the allocation ratios were previously computed. Then, when these communication status information are the same, that is, when the communication status has not changed, the data allocation unit 152 uses the stored allocation ratios to carry out data allocation. Consequently, since it is possible to omit the allocation ratio computation process, the load placed on the data allocation unit 152 is reduced.

By contrast, when the communication status information inputted from the communication status determination unit 151 differs from the communication status information stored at the time the allocation ratios were computed, that is, when the communication status has changed, the data allocation unit 152 re-computes the allocation ratios based on the inputted communication status information, and re-allocates the data on the basis of the computed allocation ratios. For example, when communication status information denoting that the mobile telephone 10 can communicate with mobile communication network 31 (HSDPA) and mobile communication network 32 (WLAN) is stored and communication status information denoting that the mobile telephone 10 can only communicate with mobile communication network 31 (HSDPA) is inputted, the data allocation unit 152 updates the allocation ratios from "mobile communication network 31 (HSDAP)=56.7%, mobile communication network 32 (WLAN)=43.3%" to "mobile communication network 31 (HSDAP)=100%," thereby allocating data only to mobile communication network 31.

Thus, the data allocation unit 152 allocates and re-allocates data to the mobile communication network with which communication has been determined to be possible on the basis of the communication status information that reflects a change in the communication status.

The transmitter 16 is means for transmitting data inputted from the allocation unit 15 to the respective mobile communication networks. The inputted data comprises the divided data that has been allocated to each mobile communication network. The transmitter 16 is able to transmit data in accordance with the communication protocols of the respective mobile communication networks. The transmitter 16 outputs this data (the divided data) to the antennas (for example, antenna 11a and 11b) that support the specified mobile communication networks based on the information for identifying the mobile communication networks comprised in the inputted data. Consequently, this data is transmitted to the group of mobile communication networks 30 via the antenna portion 11.

Figure 6:
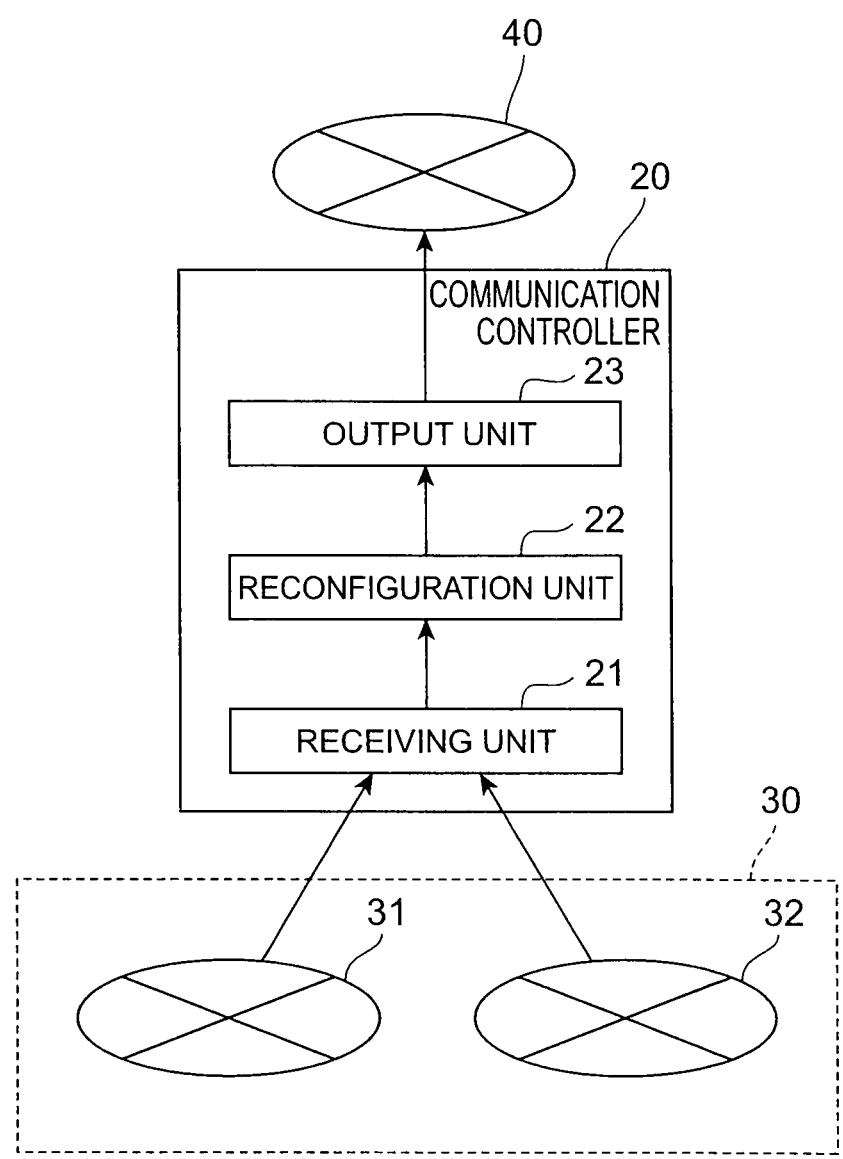
FIG. 6 is a diagram showing the functional configuration of the communication controller shown in FIG. 1.

Next, the communication controller 20 shown in FIG. 1 will be explained using FIGS. 6 and 7. FIG. 6 is a diagram showing the functional configuration of the communication controller 20, and FIG. 7 is a hardware diagram of this communication controller 20.

The communication controller 20 comprises a receiver (receiving means) 21; a reconfiguration unit (reconfiguration means) 22; and an output unit 23 as functional components.

Figure 7:
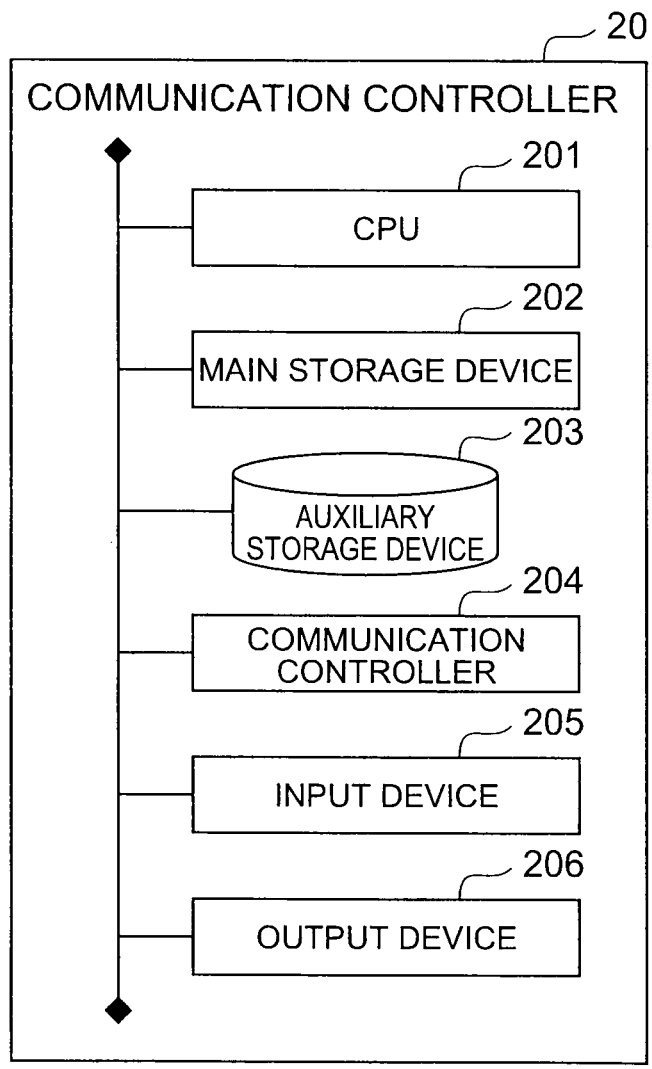
FIG. 7 is a hardware diagram of the communication controller shown in FIG. 1.

This communication controller 20, as shown in FIG. 7, is configured from a CPU 201, which executes an operating system and an application program; a main storage device 202, which is configured from ROM and RAM; an auxiliary storage device 203, which is configured from a hard disk or the like; a communication controller 204, such as a network card or the like; an input device 205, such as a keyboard; and an output device 206, such as a monitor. The respective functions shown and explained using FIG. 6 are realized by reading prescribed software programs into the CPU 201 and main storage device 202 shown in FIG. 7, operating the communication controller 204 under the control of the CPU 201, and, in addition, carrying out the writing in and reading out of data to and from the main storage device 202 and auxiliary storage device 203.

The receiver 21 is means for receiving data transmitted from the group of mobile communications networks 30. In particular, the receiver 21 receives the data (divided data) allocated and transmitted to each mobile communication network by the mobile telephone 10, and outputs this data to the reconfiguration unit 22.

The reconfiguration unit 22 is means for restoring original data (the data generated by the data generator 14 of the mobile telephone 10) by reconfiguring a plurality of divided data inputted from the receiver 21. Then, the reconfiguration unit 22 outputs the reconfigured data (restored data) to the output unit 23. Furthermore, when a transmission delay occurs in a part of a mobile communication network, the reconfiguration unit 22 can wait until all the divided data has been inputted before executing a reconfiguration.

The output unit 23 is means for outputting restored data that has been inputted from the reconfiguration unit 22 to the other communication apparatus (not shown in the figure) via the network 40. Furthermore, the output method is not limited to this, and, for example, the output unit 23 can also output the restored data to another processor (not shown in the figure) inside the communication controller 20.

Figure 8:
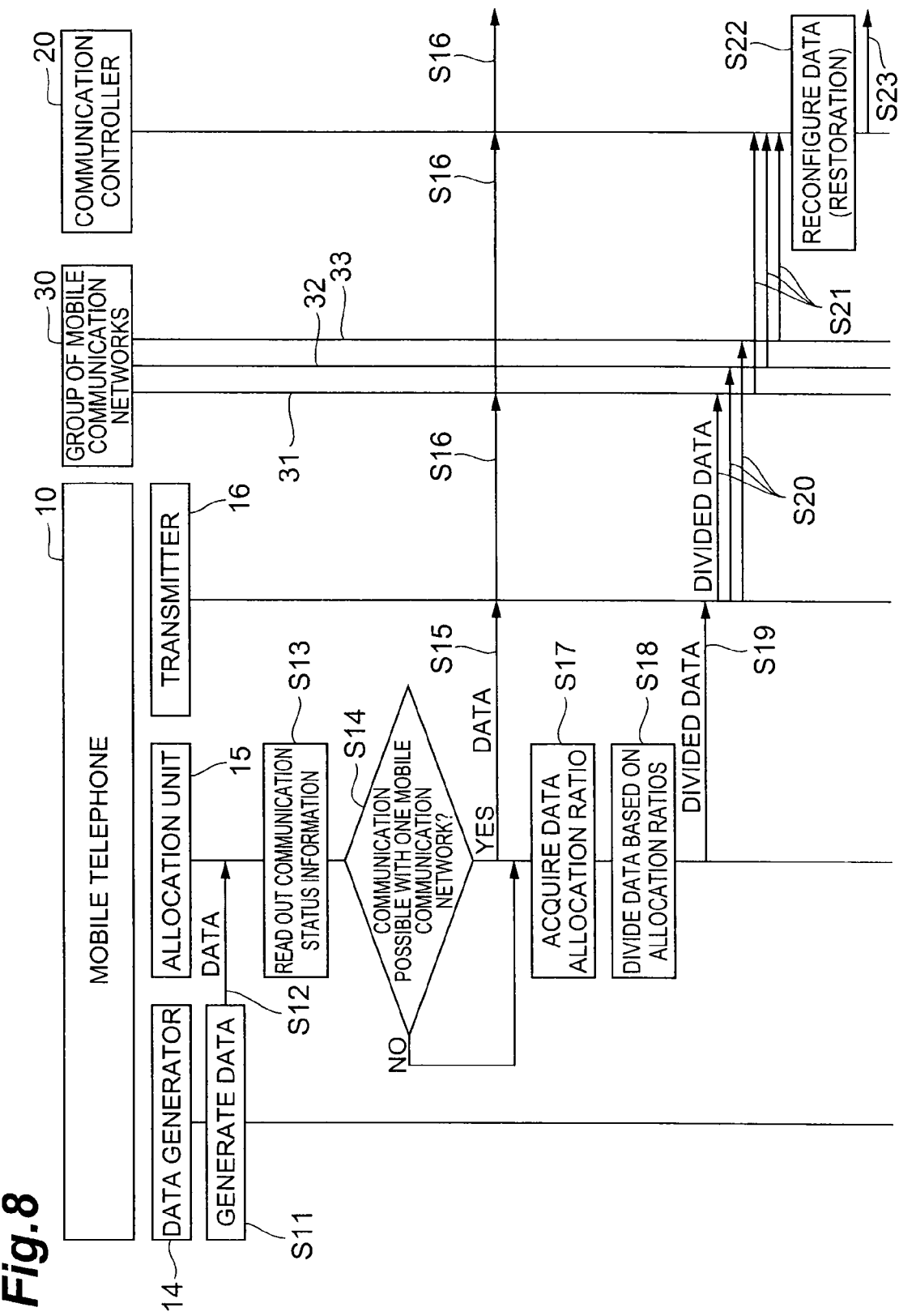
FIG. 8 is a sequence diagram showing the processing from data generation in the mobile telephone to data reconfiguration in the communication controller.
Figure 9:
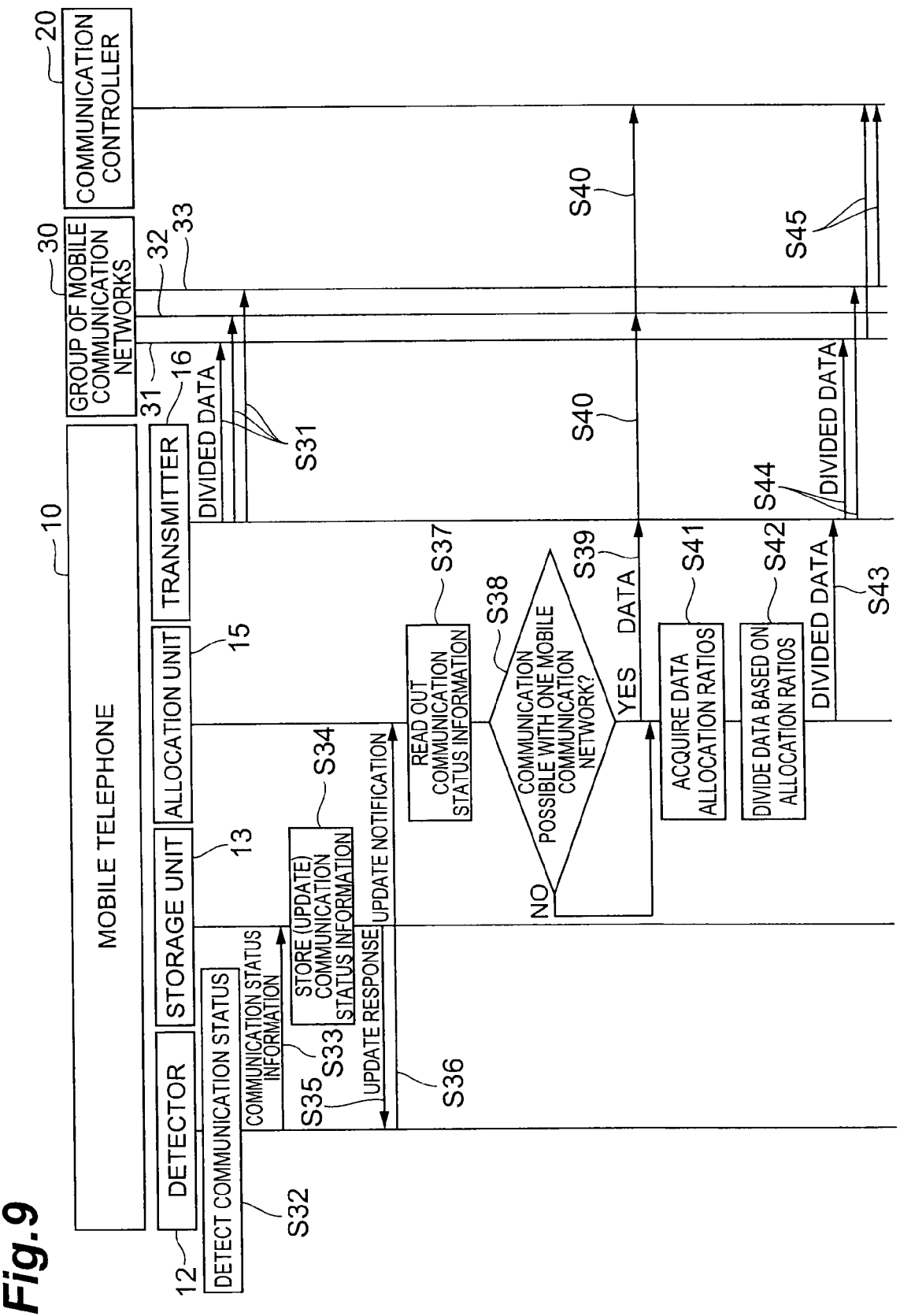
FIG. 9 is a sequence diagram showing the processing when the communication status changes during data transmission.

Next, in addition to using FIGS. 8 and 9 to explain the processing of the mobile telephone 10 and communication controller 20 shown in FIG. 1, a data transmission method and data reception method related to this embodiment will also be explained. FIG. 8 is a sequence diagram showing the processing from the generation of data by the mobile telephone 10 to the reconfiguration of data by the communication controller 20. FIG. 9 is a sequence diagram showing the processing when the communication status of the group of mobile communication networks 30 changes during data (divided data) transmission.

Firstly, the process for transmitting generated data will be explained using FIG. 8. In this case, first of all, the data generator 14 generates data addressed to the other communication apparatus (Step S11), and outputs this generated data to the allocation unit 15 (Step S12). Next, the allocation unit 15 reads out the communication status information from the storage unit 13 (Step S13, allocation step), and determines the number of mobile communication networks with which communication is possible (Step S14, allocation step). When communication is only possible with one mobile communication network here (Step S14: YES), the allocation unit 15 outputs the data to the transmitter 16 without dividing the data (Step S15, allocation step). Then, the transmitter 16 transmits the data to the mobile communication network with which communication is possible (mobile communication network 31 in FIG. 8) (transmission step), and mobile communication network 31 and communication controller 20 relay this data (Step S16).

By contrast, when there is a plurality of mobile communication networks with which communication is possible (Step S14: NO), the allocation unit 15 acquires the data allocation ratios on the basis of the communication status information (Step S17, allocation step). Specifically, the allocation unit 15 compares the communication status information used in the previous data allocation against the communication status information read out by the processing of the above-mentioned Step S13. Then, if these pieces communication status information are the same, the allocation unit 15 reads out the allocation ratios used in the previous data allocation, and if the two pieces of communication status information are different, the allocation unit 15 computes the allocation ratios based on the communication status information read out by the processing of the above-mentioned Step S13.

Next, the allocation unit 15 divides the data on the basis of the acquired allocation ratios (Step S18, allocation step). At this time, the allocation unit 15 divides the data based on the data size, and the communication speed of the respective mobile communication networks with which communication is possible. Next, the allocation unit 15 outputs the plurality of divided data to the transmitter 16 (Step S19). Next, the transmitter 16 transmits the respective divided data to the specified mobile communication network (any of the mobile communication networks 31 through 33 in FIG. 8) (Step S20, transmission step). The respective mobile communication networks 31 through 33 output the divided data to the communication controller 20 (Step S21).

In the communication controller 20, the receiver 21 receives the divided data from the respective mobile communication networks 31 through 33 (reception step). Next, the reconfiguration unit 22 restores the data by reconfiguring the plurality of divided data (Step S22, reconfiguration step). Next, the output unit 23 outputs the restored data (Step S23).

Next, the processing when the communication status changes will be explained using FIG. 9. The premise here is that the transmitter 16 is in the process of transmitting the divided data to the mobile communication networks 31 through 33 (Step S31).

When the communication status of the group of mobile communication networks 30 changes, first, the detector 12 detects this communication status (Step S32, detection step). Specifically, the detector 12 detects the communication status, such as the availability of communications and communication quality, by analyzing the control signals transmitted from the respective mobile communication networks. The detector 12 outputs the detected communication status to the storage unit 13 as communication status information (Step S33).

Next, the storage unit 13 updates the communication status information by storing the inputted communication status information (Step S34, storage step). At this time, the storage unit 13 can store the inputted communication status information as processed information using binarization or some other such method, or the storage unit 13 can store the inputted communication status information as-is. The storage unit 13 outputs an update response to the detector 12 subsequent to update processing (Step S35). Next, the detector 12 outputs an update notification to the allocation unit 15 (Step S36).

The processing subsequent to this (Steps S37 through S45) is the same as the processing of Steps S13 through S21 shown in FIG. 8. However, in Step S44, data re-allocation is carried out as a result of the change in the communication status such that data is transmitted only to mobile communication networks 31 and 33.

Next, an example of data allocation (including re-allocation) by the allocation unit 15 will be described using FIGS. 10 through 13. FIGS. 10 through 13 are diagrams showing data allocation patterns by the allocation unit 15.

Figure 10:
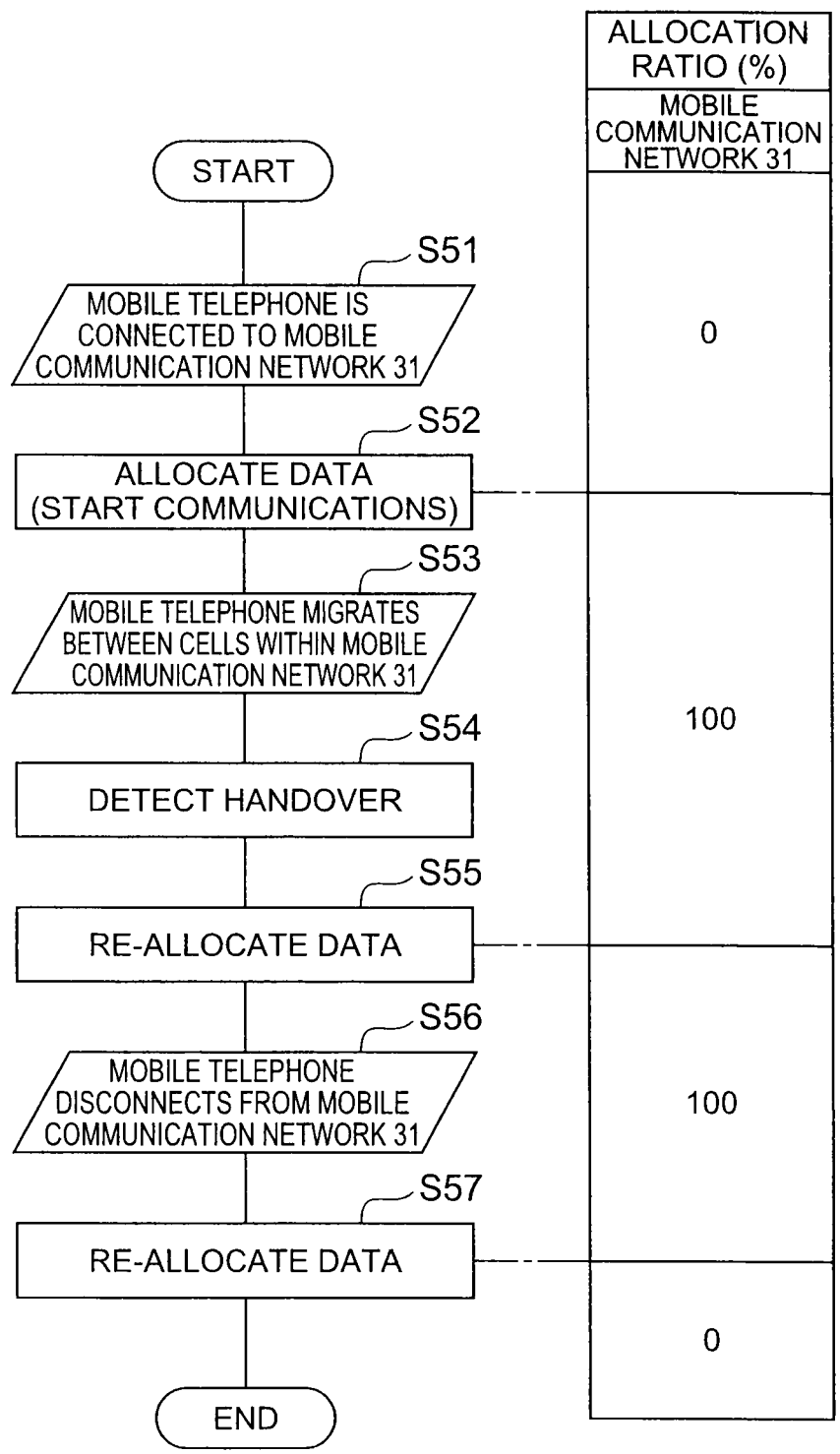
FIG. 10 is a diagram showing a data allocation pattern by the allocation unit shown in FIG. 2.

The example shown in FIG. 10 shows the operation when the mobile telephone 10 is connected to the mobile communication network 31 as a result of powering ON, this mobile telephone 10 migrates between cells inside the mobile communication network 31, and finally the mobile telephone 10 disconnects from the mobile communication network 31 as a result of powering OFF.

In this case, the allocation ratio of the mobile telephone 10 relative to the mobile communication network 31 is 0(%) (or the allocation ratio is unregistered) until the mobile telephone 10 is connected to the mobile communication network 31. When the mobile telephone 10 is connected to the mobile communication network 31 thereafter (Step S51), the detector 12 detects this connection, and the storage unit 13 stores communication status information that reflects this connection. Then, the allocation unit 15 updates the allocation ratio of the mobile communication network 31 to 100 (%) (or newly registered) on the basis of the stored communication status information (Step S52).

Thereafter, when the mobile telephone 10 migrates between cells inside the mobile communication network 31 (Step S53), the detector 12 detects the occurrence of a handover by analyzing the control signal (Step S54), and the storage unit 13 updates the communication status information based on this detection. Then, the allocation unit 15 re-computes the allocation ratios on the basis of post-update communication status information (Step S55). Then, when the mobile telephone 10 disconnects from the mobile communication network 31 (Step S56), the detector 12, storage unit 13 and allocation unit 15 carry out the same processing as Steps S54 and S55 to update the allocation ratio (Step S57).

Furthermore, since the handover process shown in FIG. 10 occurred inside mobile communication network 31, the allocation ratio determined for each mobile communication network, that is, the respective communication schemes do not change. Therefore, the allocation unit 15 can be configured such that data is not re-allocated when a handover occurs only inside a certain mobile communication network. Consequently, the load involved in re-allocating data can be lessened.

Figure 11:
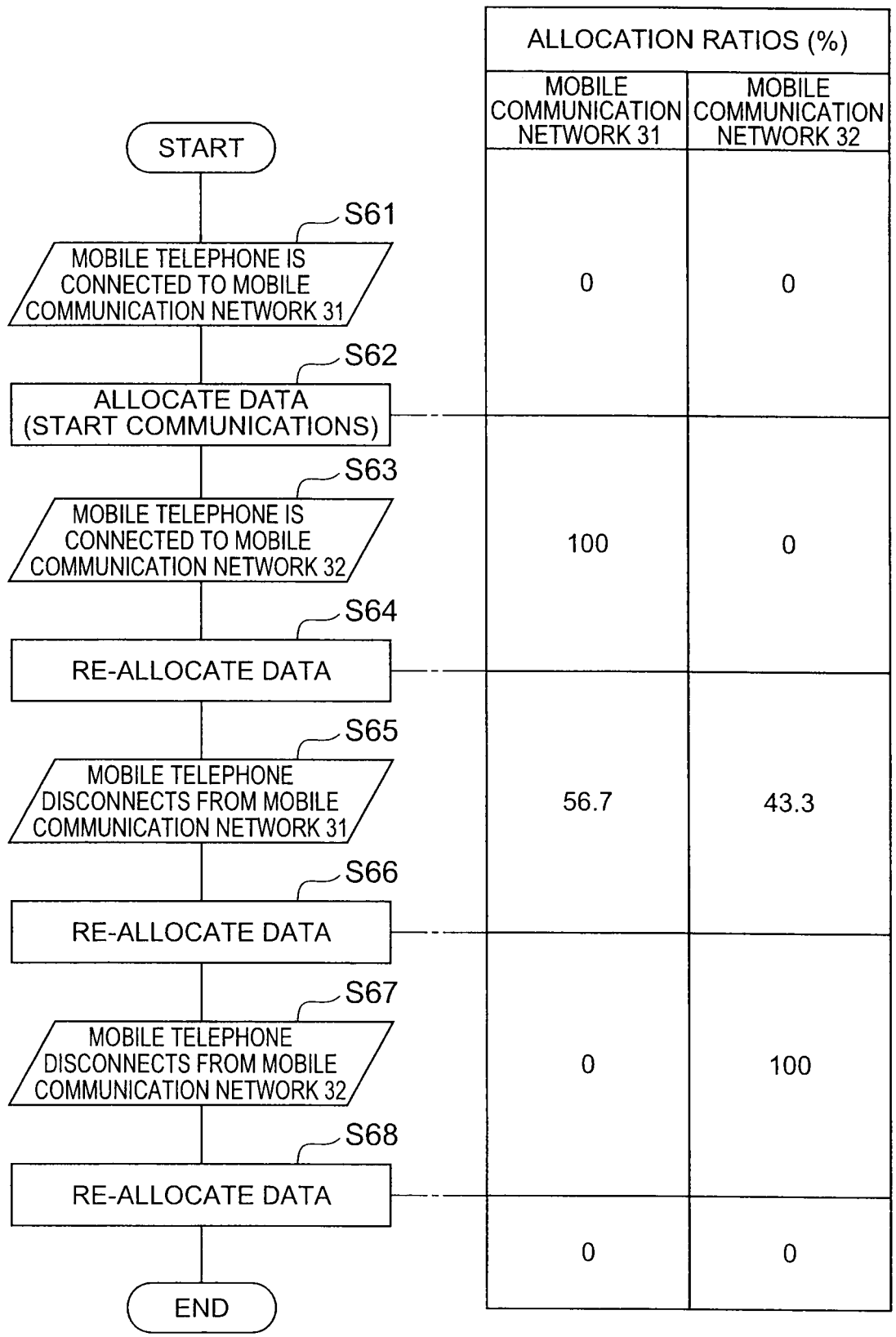
FIG. 11 is a diagram showing a data allocation pattern by the allocation unit shown in FIG. 2.

The example shown in FIG. 11 shows the operation when, subsequent to connecting to mobile communication network 31, the mobile telephone 10 is also connected to mobile communication network 32, and thereafter sequentially disconnects access from mobile communication networks 31 and 32. The processing of Steps S61 and S62 in FIG. 11 are respectively the same as the processing of Steps S51 and S52 in FIG. 10. Thereafter, when the mobile telephone 10 is also connected to mobile communication network 32 (Step S63), the communication status information reflecting this connection is stored by the detector 12 and storage unit 13. Next, the allocation unit 15 updates the allocation ratios of the mobile communication networks 31 and 32 and carries out data re-allocation based on this communication status information (Step S64).

Thereafter, when the mobile telephone 10 is disconnected from mobile communication network 31 (Step S65), the same processing as that of Step S64 is carried out, and the allocation ratios are updates such that data is transmitted only to mobile communication network 32 (Step S66). The processing of Steps S67 and S68 are respectively the same as the processing of Steps S56 and S57 in FIG. 10.

Furthermore, in FIG. 11, the connections to mobile communication networks 31 and 32 and the timing of the disconnections from these mobile communication networks differ for each communication network, but there can also be a case in which the mobile telephone 10 is simultaneously (or nearly simultaneously) connected to a plurality of mobile communication networks or is simultaneously disconnected therefrom. In this case, the allocation unit 15 decides the allocation ratios via a one-time data re-allocation process for the connections or disconnections that occurred simultaneously. For example, when the processing of Steps S61 and S63 in FIG. 11 take place simultaneously, the allocation unit 15 only carries out the processing of Step S64. As a result, the allocation ratio of mobile communication network 31 is updated from 0(%) to 56.7(%), and the allocation ratio of mobile communication network 32 is updated from 0(%) to 43.3(%).

Figure 12:
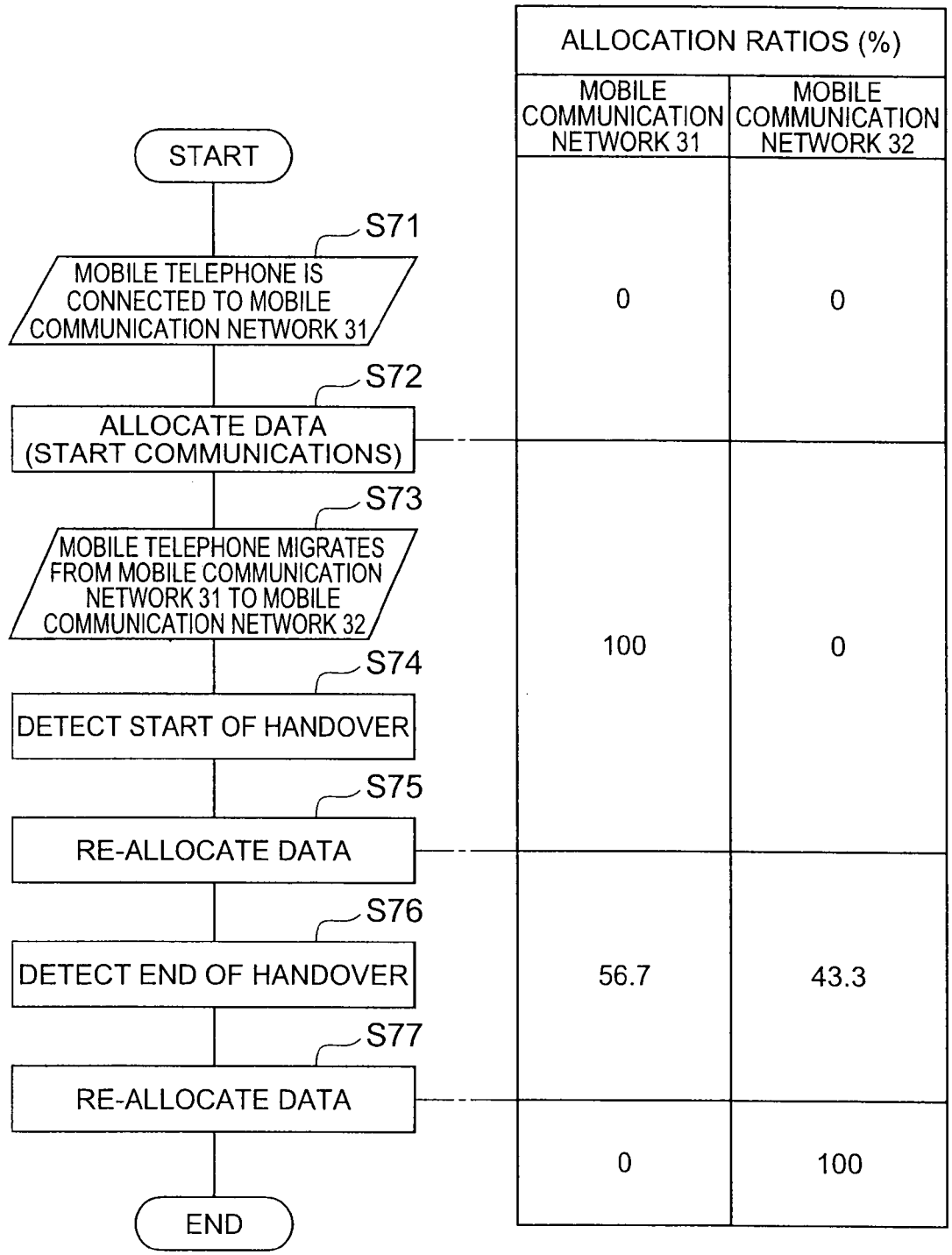
FIG. 12 is a diagram showing a data allocation pattern by the allocation unit shown in FIG. 2.

The example shown in FIG. 12 shows the operation when the mobile telephone 10 migrates from the mobile communication network 31 area to the mobile communication network 32 area. The processing of Steps S71 and S72 are respectively the same as the processing of Steps S51 and S52 in FIG. 10. Thereafter, when the mobile telephone 10 migrates from the mobile communication network 31 area to the mobile communication network 32 area (Step S73), the detector 12 detects the handover that occurs in line with this migration by analyzing the control signal (Step S74), and the storage unit 13 updates the communication status information based on this detection. Next, the allocation unit 15 re-allocates the data on the basis of the updated communication status information (Step S75).

While the handover process is being carried out, the mobile telephone 10 is temporarily able to communicate with both mobile communication network 31 and 32. For this reason, the allocation ratios are updated such that the data is allocated to both mobile communication networks 31 and 32 by data allocation processing (Step S75) immediately subsequent to the start of handover. Thereafter, when the mobile telephone 10 completely migrates from mobile communication network 31 to mobile communication network 32, and the detector 12 detects this migration (end of handover) (Step S76). Then, the allocation unit 15 updates the allocation ratios such that data is only transmitted to mobile communication network 32, and carries out data re-allocation (Step S77).

Figure 13:
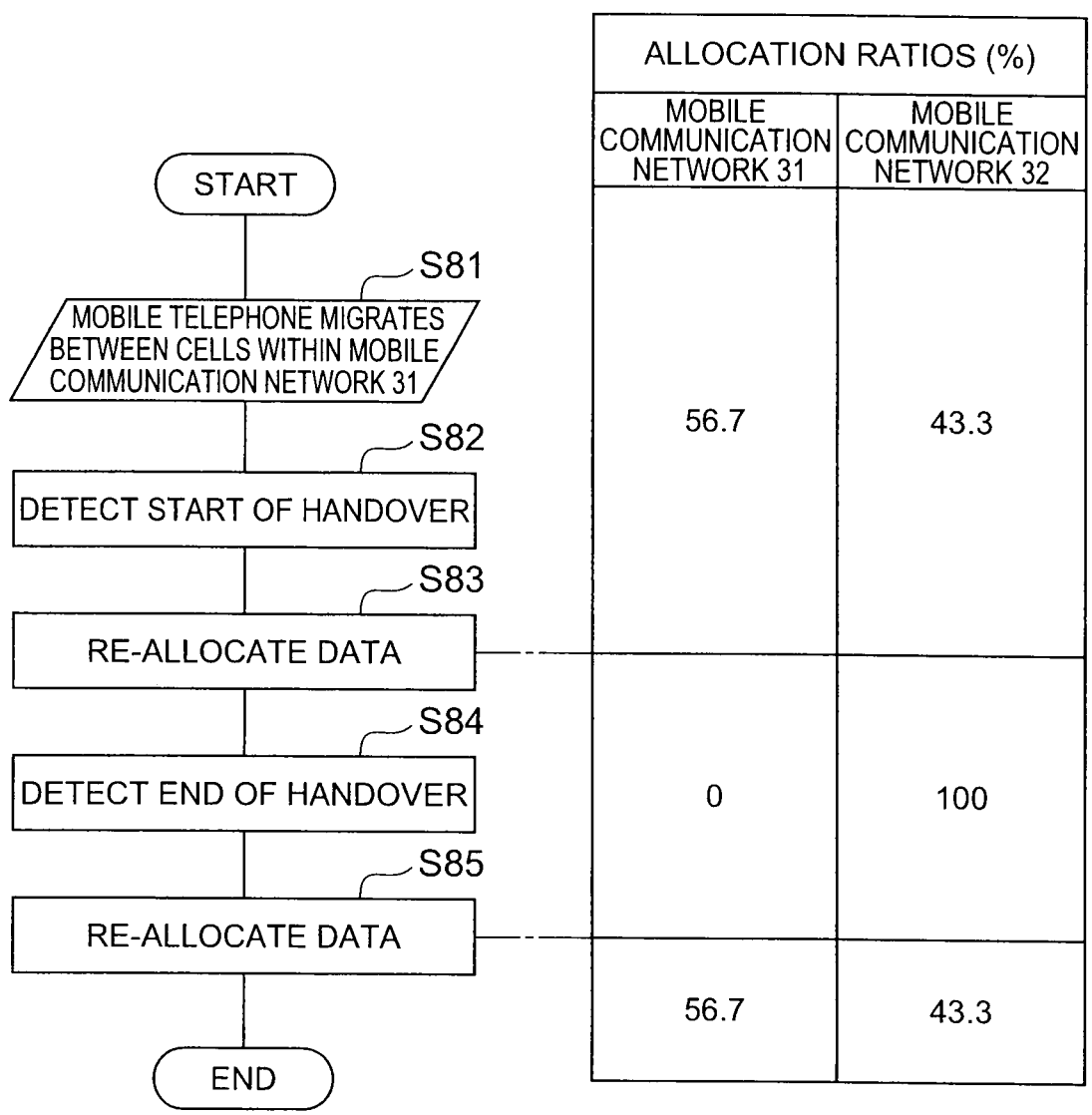
FIG. 13 is a diagram showing a data allocation pattern by the allocation unit shown in FIG. 2.

The example shown in FIG. 13 shows the operation when the mobile telephone 10 carries out an inter-cell migration within the mobile communication network 31 while the mobile telephone 10 is connected to both mobile communication networks 31 and 32. When the mobile telephone 10 performs an inter-cell migration within mobile communication network 31 (Step S81), the detector 12 detects the handover that takes place in line with this inter-cell migration by analyzing the control signal (Step S82). Next, the allocation unit 15 re-allocates the data (Step S83). The respective allocation ratios of the mobile communication networks 31 and 32 are updated to 0(%) and 100(%) by this re-allocation, and data is allocated only to a mobile communication network other than mobile communication network 31 with which communication has become impossible due to the handover, that is, mobile communication network 32. Thereafter, when the handover within mobile communication network 31 has ended, the detector 12 detects this change (Step S84), and the allocation unit 15 re-allocates the data once again (Step S85). At this time, the allocation unit 15 updates the allocation ratios of the mobile communication networks 31 and 32 to the values of prior to the occurrence of the handover.

Furthermore, this embodiment is not limited to the examples of FIGS. 10 through 13, and the mobile telephone 10 is able to carry out the allocation of data under various communication states of the mobile telephone 10. For example, when congestion occurs in a certain mobile communication network, or the communication quality of a certain mobile communication network either worsens or improves, the mobile telephone 10 can detect this change in the communication status, and can carry out data allocation (re-allocation) on the basis of the detected communication status.

As has been explained hereinabove, according to this embodiment, the communication status of a mobile communication network is detected on the basis of a control signal transmitted from this mobile communication network (for example, mobile communication networks 31, 32), and is stored as communication status information. Next, this data is respectively allocated to the connected mobile communication network based on the amount of data (data size) addressed to the other communication apparatus and the stored communication status information, and transmitted to the respective mobile communication networks. Consequently, since the data is allocated to the respective mobile communication networks in accordance with the communication status of the mobile telephone 10, it is possible to transmit data via a plurality of types of mobile communication networks in accordance with the communication environment at the time of data transmission.

Transmitting data via a plurality of types of mobile communication networks using this method makes it possible to improve the overall data transmission rate, and, in addition, makes it possible to transmit data more reliably without causing transmission interruptions. That is, this embodiment makes it possible to optimize the transmission of data to a mobile communication terminal.

Further, according to this embodiment, when the communication status of the mobile communication network is updated, data re-allocation is dynamically carried out on the basis of the latest communication status. As a result, it is possible for the data to be transmitted in the optimum form each time in accordance with a change in the communication environment.

Further, according to this embodiment, the allocation of data to respective mobile communication networks is carried out based on the communication speed of the respective communication networks to which the mobile telephone 10 is connected. Since the communication speed of the mobile communication network affects the data transmission efficiency, taking this communication speed into account when carrying out data allocation makes it possible to transmit data more efficiently to the other communication apparatus.

Further, according to this embodiment, divided data, which is allocated to each mobile communication network by the mobile telephone 10, is received by the communication controller 20, and the pre-allocation data is reconfigured from the received respective divided data. Consequently, it becomes possible to use the data that has been restored to its original form.

The present invention has been explained in detail hereinabove based on this embodiment. However, the present invention is not limited to the above-described embodiment. The various variations hereinbelow are also possible within a scope that does not depart from the gist of the present invention.

Further, in the embodiment, the data allocation ratios were computed in accordance with the above-mentioned equation (1) based on the communication speed of the respective mobile communication networks, but the data allocation method is not limited to this. For example, the data allocation unit 152 can store allocation ratios for each combination of allocation-targeted mobile communication networks beforehand, and can allocate data in accordance with these allocation ratios. For example, the allocation ratios can be decided in advance such that, if the allocation-targeted mobile communication networks are "HSDPA, WLAN", the allocation ratios are "HSDPA=40%, WLAN=60%" or if the allocation-targeted mobile communication networks are "CDMA, HSDPA, WLAN", the allocation ratios are "CDMA=40%, HSDPA=20%, WLAN=40%". Further, the data allocation unit 152 can also compute the allocation ratios using an equation that differs from the above-mentioned equation (1) by taking into account a specification of the respective communication schemes other than communication speed.

Further, in the above-described embodiment, the allocation unit 15 determined the necessity of data allocation (data division) based on the subscription information and communication status of the mobile telephone 10, but the method for determining the necessity of data allocation is not limited to this. For example, the necessity of data allocation can be determined on the basis of the amount of data (data size) to be transmitted to the communication controller 20, or the difference of the communication speed of the plurality of mobile communication networks to which the mobile telephone 10 is connected.

For example, when the data size is less than a prescribed value (for example, 10 kilobytes), the allocation unit 15 can determine that data allocation is not necessary, and can output the data addressed to the other communication apparatus to the transmitter 16 without carrying out data allocation (data division). Consequently, since the number of times that data allocation is carried out is reduced, the data allocation processing load placed on the mobile telephone 10 can be curbed. In addition, since the communication controller 20 can use the data that has been transmitted as-is, the load placed on the communication controller 20 can also be held down.

Further, when the difference in the communication speed of a plurality of mobile communication networks is extremely large, there are times when data transmission efficiency will be lowered by data division. For example, when the mobile telephone 10 is connected to a PDC (communication speed of 9.6 kbps) mobile communication network and an HSDPA (communication speed of 14.4 Mbps) mobile communication network, based on the above-described embodiment, the allocation ratios for these would be "HSDPA=99.93(%), PDC=0.07(%)". Thus, this is practically the same as only using the HSDPA mobile communication network, and even runs the risk of data transmission being delayed to the extent that data allocation is carried out. For this reason, the allocation unit 15 can make the determination that data allocation is not necessary when the difference in the allocation ratios between a plurality of mobile communication networks is greater than a prescribed threshold value (for example, greater than 50%), or when one allocation ratio from among the allocation ratios of a plurality of mobile communication networks is greater than a prescribed threshold value (for example, 90%).

Further, the allocation unit 15 can decide allocation ratios in accordance with a signal strength or reception level that is stored in the storage unit 13. For example, when the storage unit 13 stores signal strength as one of three levels (strong, medium, weak), the allocation unit 15 will store allocation ratios of "100(%)", "50(%)" and "0(%)" relative to the respective levels of "strong", "medium" and "weak". Then, the allocation unit 15 can allocate data on the basis of the allocation ratio corresponding to read-out communication status information.

Further, in the above-described embodiment, a mobile telephone 10 was used as the mobile communication terminal, but other types of communication terminals, such as a Personal Digital Assistant (PDA) can also be used.

Further, in the above-described embodiment, all the communication networks used by the mobile telephone 10 were wireless communication networks, but the mobile telephone 10 can also use a wired communication network. For example, the present invention can also be applied when the mobile telephone 10 accesses a personal computer (PC) that is connected to the Internet, and carries out data transmission by way of the PC. As a result, for example, it becomes possible to divide and transmit data even when the mobile telephone 10 is simultaneously using wireless and wired communications.

Further, in the above-described embodiment, the communication controller 20 carries out data reconfiguration, but a communication terminal, such as a mobile telephone or personal computer, or another relay apparatus can carry out data reconfiguration.

What is claimed is:

1. A mobile communication terminal being connected to a plurality of types of communication networks, comprising:
    a detector configured to detect a communication status of each of the plurality of types of communication networks to which the mobile communication terminal is simultaneously connected via a plurality of communication schemes on the basis of a control signal transmitted from each communication network;
    a memory configured to store the communication statuses detected by the detector, each communication status being associated with a corresponding communication scheme;
    a processor configured to allocate data to each communication network based on an amount of data addressed to another communication apparatus and the communication statuses stored by the memory; and
    a transmitter configured to transmit the data allocated to each communication network by the processor to the respective communication networks, wherein
    the processor is configured to determine whether to perform data division based on the amount of data addressed to the another communication apparatus and a difference of communication speed of each communication network, and divides the data if the data division is determined to be performed.

2. The mobile communication terminal according to claim 1, wherein the processor is configured to re-allocate the data addressed to the another communication apparatus when a communication status of at least one of the communication networks is updated.

3. A communication apparatus capable of being connected to a plurality of types of communication networks and carrying out data communication with the mobile communication terminal described according to claim 1, comprising:
    a receiver configured to receive data, which has been allocated and transmitted to each communication network by the mobile communication terminal, from the respective communication networks; and
    a processor configured to carry out reconfiguring so as to restore pre-allocation data from the data received by the receiver.

4. A data reception method for a communication apparatus, which is connected to a plurality of types of communication networks, and receives data from the mobile communication terminal described according to claim 1, comprising:
    receiving data, which has been allocated and transmitted to each communication network by the mobile communication terminal, from the respective communication networks; and
    reconfiguring so as to restore pre-allocation data from the data received in the receiving step.

5. The mobile communication terminal according to claim 1, wherein the processor is configured to determine not to perform the data division when the amount of the data addressed to the another communication apparatus is less than a threshold value, and otherwise determines that the data division is to be performed.

6. The mobile communication terminal according to claim 1, wherein the processor is configured to determine not to perform the data division when a difference in allocation ratios between each communication network is greater than a threshold, and otherwise determines that the data division is to be performed.

7. The mobile communication terminal according to claim 1, wherein the processor is configured to determine not to perform the data division when one allocation ratio from among each allocation ratio for each communication network is greater than a threshold value, and otherwise determines that the data division is to be performed.

8. A data transmission method for a mobile communication terminal being connected to a plurality of types of communication networks, comprising:

detecting a communication status of each of the plurality of types of communication networks to which the mobile communication terminal is simultaneously connected via a plurality of communication schemes on the basis of a control signal transmitted from each communication network;

storing the detected communication statuses, each communication status being associated with a corresponding communication scheme;

allocating data to each communication network based on an amount of data addressed to another communication apparatus and the stored communication statuses; and transmitting the data allocated to each communication network to the respective communication networks, wherein the allocating includes determining whether to perform data division based on the amount of data addressed to the another communication apparatus and a difference of communication speed of each communication network, and dividing the data if the data division is determined to be performed.

* * * * *